(12) United States Patent
Park et al.

(10) Patent No.: US 7,537,651 B2
(45) Date of Patent: May 26, 2009

(54) INK COMPOSITION HAVING AZO-BASED COLORANT AND INK SET USING THE SAME

(75) Inventors: Heung-sup Park, Suwon-si (KR); Hee-jung Roh, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/733,513

(22) Filed: Apr. 10, 2007

(65) Prior Publication Data

US 2008/0092770 A1   Apr. 24, 2008

(30) Foreign Application Priority Data

Oct. 20, 2006   (KR) .................. 10-2006-0102479

(51) Int. Cl.
*C09D 11/00* (2006.01)
*C09D 11/02* (2006.01)
*B41J 2/01* (2006.01)

(52) U.S. Cl. .............. 106/31.51; 106/31.48; 106/31.52; 347/86; 347/100

(58) Field of Classification Search .............. 106/31.48, 106/31.51, 31.52; 347/86, 100
See application file for complete search history.

(56) References Cited

U.S. PATENT DOCUMENTS

| | | | | |
|---|---|---|---|---|
| 4,703,113 A * | 10/1987 | Baxter et al. | ............ | 106/31.48 |
| 5,180,425 A * | 1/1993 | Matrick et al. | ............ | 106/31.58 |
| 5,534,050 A * | 7/1996 | Gundlach | ............... | 106/31.58 |
| 5,542,970 A * | 8/1996 | Miura et al. | ............. | 106/31.43 |
| 6,395,885 B1 | 5/2002 | Lavery et al. | | |
| 6,706,104 B2 * | 3/2004 | Takuhara et al. | ......... | 106/31.52 |
| 6,709,502 B2 * | 3/2004 | Baettig | ................... | 106/31.51 |
| 6,749,290 B2 * | 6/2004 | Takada et al. | ............... | 347/100 |
| 2002/0121221 A1 | 9/2002 | Baettig | | |
| 2003/0107632 A1 * | 6/2003 | Arita et al. | .................. | 347/100 |
| 2006/0096498 A1 | 5/2006 | Tsujimura et al. | | |

FOREIGN PATENT DOCUMENTS

| | | |
|---|---|---|
| EP | 1 426 194 | 6/2004 |
| JP | 2001-131442 | 5/2001 |
| WO | WO 99/64526 | 12/1999 |

OTHER PUBLICATIONS

European Search Report dated Apr. 25, 2008 issued in EP 07107951.1.

* cited by examiner

*Primary Examiner*—Helene Klemanski
(74) *Attorney, Agent, or Firm*—Stanzione & Kim, LLP

(57) ABSTRACT

An ink composition including an azo-based colorant and an ink set using the same. More particularly, an ink composition which uses a lithium salt and a derivative including hydroxynaphthalene of a chromophore as colorants, and includes etriol and an acetylene glycol-based compound, and an ink set using the same.

18 Claims, 1 Drawing Sheet

INK COMPOSITION HAVING AZO-BASED COLORANT AND INK SET USING THE SAME

CROSS-REFERENCE TO RELATED APPLICATIONS

This application claims priority under 35 U.S.C. §119(a) from Korean Patent Application No. 10-2006-0102479, filed on Oct. 20, 2006, in the Korean Intellectual Property Office, the disclosure of which is incorporated herein in its entirety by reference.

BACKGROUND OF THE INVENTION

1. Field of the Invention

The present general inventive concept relates to an ink composition including an azo-based colorant and an ink set using the same, and more particularly, to an ink composition which uses a lithium salt and a derivative including hydroxynaphthalene of a chromophore as colorants, and includes etriol and an acetylene glycol-based compound to improve a solubility and a thermal stability, and an ink set using the same.

2. Description of the Related Art

Generally, a pigment-type ink for inkjet printers needs to have stable properties during long-term storage, a solubility of dyestuffs in ink for inkjet printers needs to be high enough not to block inlets of nozzles, and printed images need to have a high optical density. In addition, ink should not block the nozzles due to decomposition and kogation during long-term storage.

Recently, thermal head inkjet printers and piezoelectric head inkjet printers have been widely used, and thus ink of inkjet printers need to have properties suitable for both types of inkjet printers.

Colorants, including a lithium salt and a derivative including hydroxynaphthalene of a chromophore, have been widely used in inkjet ink, printing ink, paints, textile printing, paper manufacture, cosmetic manufacture, the ceramic industry, and the like.

Colorants, including anionic dyestuffs and lithium salts, have been already disclosed. For example, according to U.S. Pat. No. 6,395,885, when the anionic dyestuffs and lithium salts are used together, a solubility and a lighffastness can be improved.

However, the improved solubility is not sufficient to prevent blocking nozzles in array head printers, and a reaction of colorants and an occurrence of kogation on a surface of a heater.

SUMMARY OF THE INVENTION

The present general inventive concept provides an ink composition of inkjet printers having an improved uniformity in printed images, and a long-term reliability by improving a solubility and a thermal stability, wherein reaction of ink and occurrence of kogation are prevented on a surface of a heater.

The present general inventive concept also provides an ink set using the ink composition.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an ink composition, including an azo-based colorant represented by Formula 1, etriol, an acetylene glycol-based compound, and a solvent.

Formula 1:

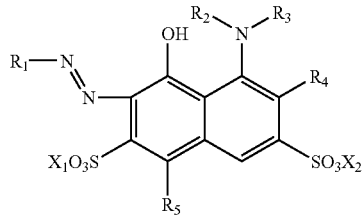

where $R_1$, $R_2$, $R_3$, $R_4$, and $R_5$ can each independently be one of a hydrogen atom, a halogen atom, a nitro group, a hydroxyl group, an amino group, a cyano group, a substituted or unsubstituted C1-C20 alkyl group, a substituted or unsubstituted C2-C20 alkenyl group, a substituted or unsubstituted C1-C20 alkoxy group, a substituted or unsubstituted C2-C20 alkoxycarbonyl group, a substituted or unsubstituted C2-C20 alkoxycarbonylamino group, a carbamoyl group, a sulfamoyl group, a sulfonate group, carboxy group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, and wherein at least one of the hydrogen atoms is water-soluble, and $X_1$ and $X_2$ are each independently H or Li.

The foregoing and/or other aspects and utilities of the present general inventive concept may also be achieved by providing a multicolor ink set including at least two of ink compositions, wherein at least one of the ink compositions includes an azo-based colorant represented by Formula 9, etriol, an acetylene glycol-based compound, and a solvent:

Formula 9:

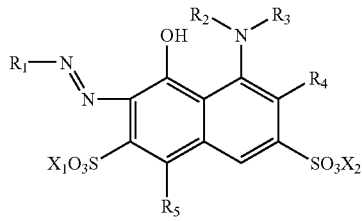

where $R_1$, $R_2$, $R_3$, $R_4$, and $R_5$ can each be independently selected from a group consisting of a hydrogen atom, a halogen atom, a nitro group, a hydroxyl group, an amino group, a cyano group, a substituted or unsubstituted C1-C20 alkyl group, a substituted or unsubstituted C2-C20 alkenyl group, a substituted or unsubstituted C1-C20 alkoxy group, a substituted or unsubstituted C2-C20 alkoxycarbonyl group, a substituted or unsubstituted C2-C20 alkoxycarbonylamino group, a carbamoyl group, a sulfamoyl group, a sulfonate group, carboxy group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, at least one of the hydrogen atoms is water-soluble, and $X_1$ and $X_2$ are each independently one of H and Li.

The foregoing and/or other aspects and utilities of the present general inventive concept may also be achieved by providing an ink cartridge of an inkjet recording apparatus including a multicolor ink set wherein the multicolor ink set comprises at least two ink compositions, and at least one ink composition includes an azo-based colorant represented by Formula 10, etriol, an acetylene glycol-based compound, and a solvent:

Formula 10:

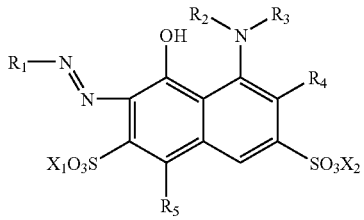

where $R_1$, $R_2$, $R_3$, $R_4$, and $R_5$ can each be independently selected from a group consisting of a hydrogen atom, a halogen atom, a nitro group, a hydroxyl group, an amino group, a cyano group, a substituted or unsubstituted C1-C20 alkyl group, a substituted or unsubstituted C2-C20 alkenyl group, a substituted or unsubstituted C1-C20 alkoxy group, a substituted or unsubstituted C2-C20 alkoxycarbonyl group, a substituted or unsubstituted C2-C20 alkoxycarbonylamino group, a carbamoyl group, a sulfamoyl group, a sulfonate group, carboxy group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, at least one of the hydrogen atoms is water-soluble, and $X_1$ and $X_2$ are each independently one of H and Li.

The foregoing and/or other aspects and utilities of the present general inventive concept may also be achieved by providing an inkjet recording apparatus including the ink cartridge including a multicolor ink set including at least two ink compositions, wherein at least one of the at least two ink compositions includes an azo-based colorant represented by Formula 10, etriol, an acetylene glycol-based compound, and a solvent:

Formula 11:

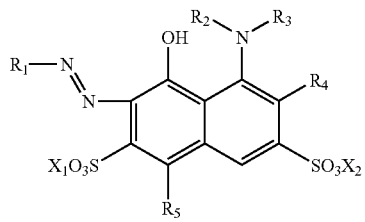

where $R_1$, $R_2$, $R_3$, $R_4$, and $R_5$ can each independently be selected from a group consisting of a hydrogen atom, a halogen atom, a nitro group, a hydroxyl group, an amino group, a cyano group, a substituted or unsubstituted C1-C20 alkyl group, a substituted or unsubstituted C2-C20 alkenyl group, a substituted or unsubstituted C1-C20 alkoxy group, a substituted or unsubstituted C2-C20 alkoxycarbonyl group, a substituted or unsubstituted C2-C20 alkoxycarbonylamino group, a carbamoyl group, a sulfamoyl group, a sulfonate group, carboxy group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, at least one of the hydrogen atoms is water-soluble, and $X_1$ and $X_2$ are each independently one of H and Li.

The foregoing and/or other aspects and utilities of the present general inventive concept may also be achieved by providing an ink composition, including an azo-based colorant, etriol, an acetylene glycol-based compound, and a solvent.

The foregoing and/or other aspects and utilities of the present general inventive concept may also be achieved by providing an image forming apparatus, including an ink cartridge containing at least one ink composition having an azo-based colorant, etriol, an acetylene glycol-based compound, and a solvent.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
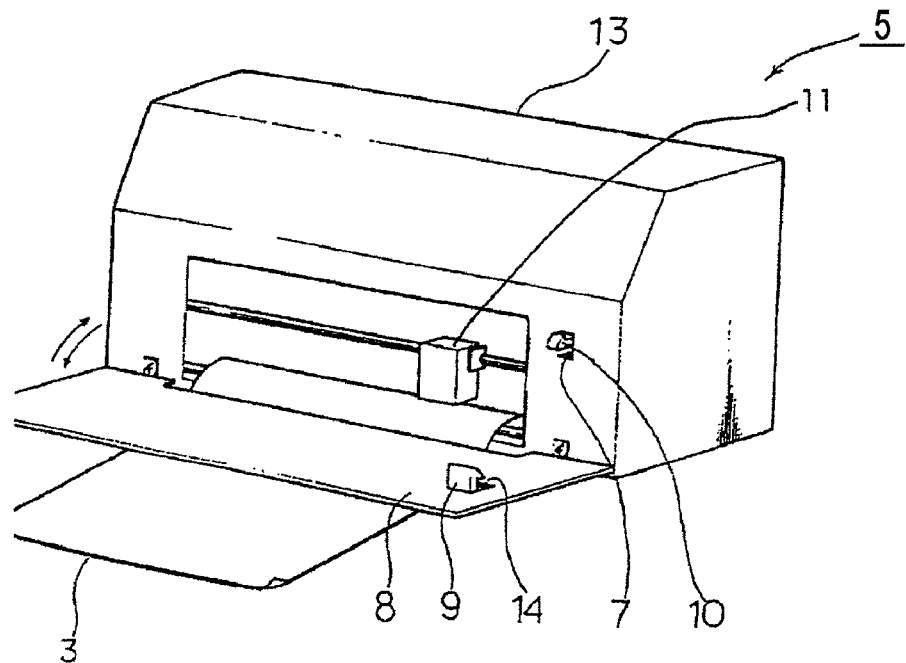
FIG. 1 is a perspective view illustrating an inkjet recording apparatus including an ink cartridge having an ink composition according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

According to an embodiment of the present general inventive concept, an ink composition may include an azo-based colorant as represented by Formula 1 below, etriol, an acetylene glycol-based compound, and a solvent.

Formula 1

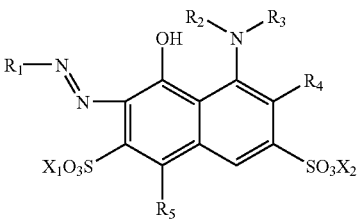

Here, $R_1$, $R_2$, $R_3$, $R_4$ and $R_5$ can each independently be one of a hydrogen atom, a halogen atom, a nitro group, a hydroxyl group, an amino group, a cyano group, a substituted or unsubstituted C1-C20 alkyl group, a substituted or unsubstituted C2-C20 alkenyl group, a substituted or unsubstituted C1-C20 alkoxy group, a substituted or unsubstituted C2-C20 alkoxycarbonyl group, a substituted or unsubstituted C2-C20 alkoxycarbonylamino group, a carbamoyl group, a sulfamoyl group, a sulfonate group, carboxy group, a substituted or unsubstituted C6-C30 aryl group, a substituted or unsubstituted C1-C20 heteroalkyl group, a substituted or unsubstituted C3-C20 heteroaryl group, a substituted or unsubstituted C2-C20 alkylcarbonyl group, a substituted or unsubstituted C7-C30 arylcarbonyl group, and a substituted or unsubstituted C4-C30 heteroarylcarbonyl group, wherein at least one of the hydrogen atoms is water-soluble, and $X_1$ and $X_2$ can each independently be one of H and Li.

The azo-based colorant represented by Formula 1 according to the present general inventive concept can be used with etriol and an acetylene glycol-based compound to obtain suitable properties to eject ink, such as, viscosity and surface tension. The etriol and the acetylene glycol-based compound have voluminous molecular structures, and thus bubbles which may cause problems in nozzles can be prevented. Further, since the two compounds have plenty of hydroxyl groups, a solubility of the azo-based colorant represented by Formula 1 can be improved, and a thermal stability can be improved due to the voluminous molecular structure of the combined compound.

Due to the improved solubility and thermal stability of the ink composition according to the above embodiment of the present general inventive concept, a uniformity of printed images may be improved, a long-term reliability of the ink may be maintained, and reaction of the ink and occurrence of kogation may be prevented on a surface of a heater, and thus ink droplets may be stably ejected during long-term use.

An ink composition according to another embodiment of the present general inventive concept may include an azo-based colorant as represented by Formula 1, etriol, an acetylene glycol-based compound, and a solvent, wherein most of the azo-based colorant represented by Formula 1 is a water-soluble anionic dyestuff. The water-soluble anionic dyestuff can be classified into a water-soluble anionic direct dyestuff, a water-soluble anionic reactive dyestuff, and a water-soluble anionic acid dyestuff. More specifically, the water-soluble anionic dyestuff may include a monoazo, a diazo, or a triazo group in a chromophore. A water-soluble group which is substituted in the compound represented by Formula 1 may be a carboxyl group or a sulfo group, and the water-soluble group may be a lithium salt.

The amount of the azo-based colorant represented by Formula 1 may be in the range of about 1-20 wt %, and about 1-10 wt % based on the total amount of the ink composition. When the amount of the azo-based colorant is less than 1 wt %, the coloring property may not be good. On the other hand, when the amount of the azo-based colorant is greater than 20 wt %, costs to manufacture the ink composition may increase.

The azo-based colorant may be a compound as represented by one of Formulae 2 to 7.

Formula 2:

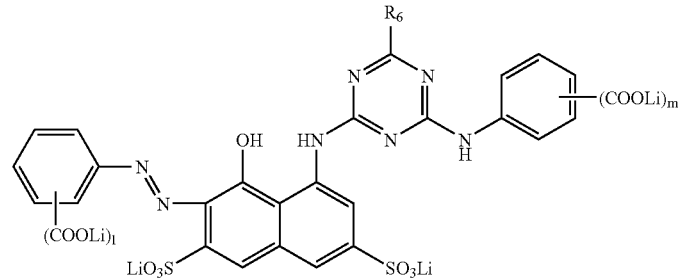

Formula 3:

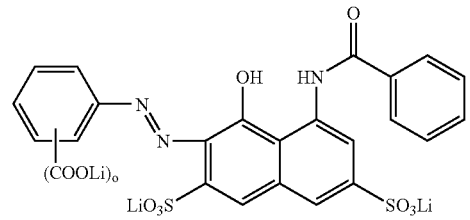

Formula 4:

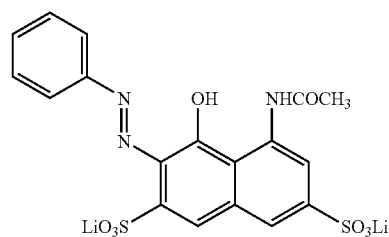

Formula 5:

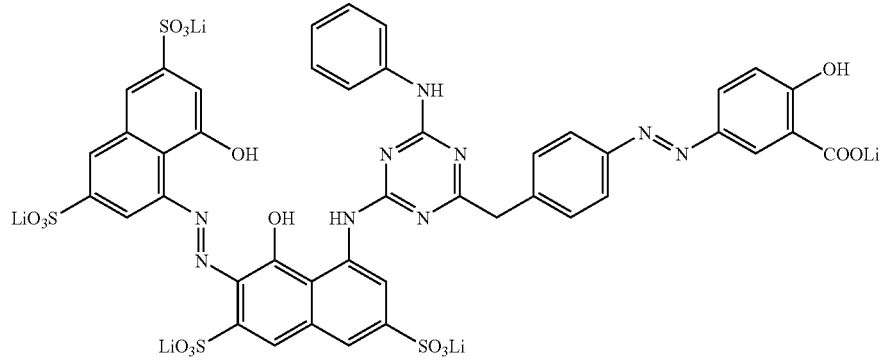

Formula 6:

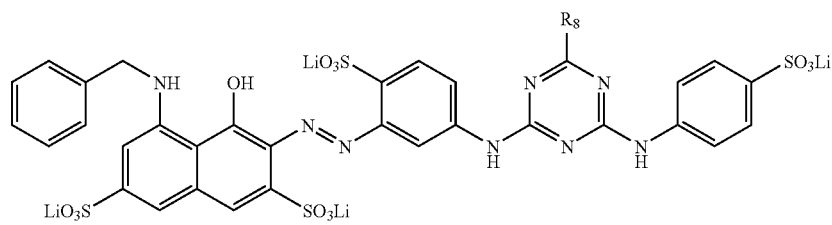

Formula 7:

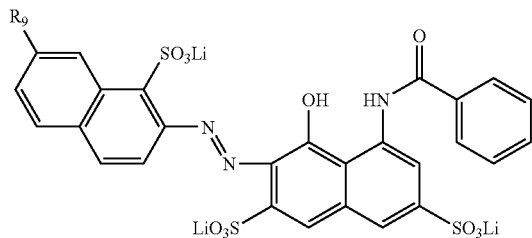

Here, $R_6$, $R_7$, $R_8$, and $R_9$ each can independently be one of a hydroxyl group, a halogen atom, and a substituted or unsubstituted C1-C10 heteroalkylsulfonic acid salt, and l, m, n, and o can each independently be an integer from 0-3.

In particular, when $R_6$, $R_7$, $R_8$, and $R_9$ are a halogen atom, or —SO$_2$CH$_2$CH$_2$OSO$_3$Na, compound including $R_6$, $R_7$, $R_8$, and $R_9$ has reactivity.

The amount of the etriol may be in the range of about 0.1-10 wt % based on the total amount of the ink composition, and the amount of the acetylene glycol-based compound may be in the range of about 0.001-10 wt % based on the total amount of the ink composition. When the amount of the etriol and the acetylene glycol-based compound is out of the range described above, a viscosity and a surface tension sufficient to eject the ink composition may not be obtained and a solubility and a thermal stability of the ink composition may not be sufficient.

The acetylene glycol-based compound may be a compound represented by Formula 8 below, but the present general inventive concept is not limited thereto, and the acetylene glycol-based compound may also be represented by other formulae.

Formula 8

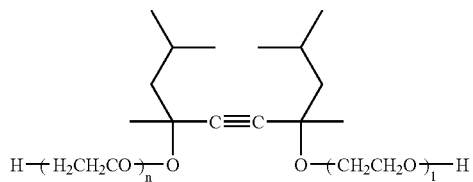

Here, the sum of n and l can be an integer from 0-100.

The solvent may be a water-based solvent and the water-based solvent may be water or may further include at least one organic solvent. The amount of solvent may be about 70-90 parts by weight based on 100 parts by weight of the total amount of the ink composition. When the amount of the solvent is less than 70 parts by weight, the viscosity of the ink composition may increase too high and an ejecting efficiency may decrease. On the other hand, when the amount of the solvent is greater than 90 parts by weight, the viscosity of the ink composition may be too low.

The organic solvent that can be included in the solvent may include at least one solvent selected from a group consisting of a monohydric alcohol, a ketone, an ester, a polyhydric alcohol, a polyhydric alcohol derivative, a nitrogen-containing compound, and a sulfur-containing compound, such as, dimethyl sulfoxide, tetramethyl sulfone, or thioglycol. A monohydric alcohol controls a surface tension of the ink, and thus can improve permeation and dot formation properties in a recording medium, such as, paper for professional or non-professional use and drying properties of the printed image. A polyhydric alcohol or its derivatives are not easily evaporated, and lower a freezing point of the ink, and thus can improve a storage stability of the ink to prevent nozzles from being blocked.

The monohydric alcohol that can be used for the organic solvent can be a lower alcohol, such as, methyl alcohol, ethyl alcohol, n-propyl alcohol, isopropyl alcohol, n-butyl alcohol, sec-butyl alcohol, and t-butyl alcohol, and can also be ethyl alcohol, isopropyl alcohol, and n-butyl alcohol. Examples of the polyhydric alcohol may include an alkylene glycol, such as, ethylene glycol, diethylene glycol, triethylene glycol, propylene glycol, butylene glycol, and glycerol, a polyalkylene glycol, such as, polyethylene glycol and polypropylene glycol, and a thiodiglycol. Examples of the polyhydric alcohol derivative may include a lower alkylether of a polyhydric alcohol, such as, ethyleneglycoldimethylether, and a lower carboxylic acid ester, such as, ethyleneglycoldiacetate. Examples of the ketone may include acetone, methylethylketone, diethylketone, and diacetone alcohol, and examples of the ester may include methyl acetate, ethyl acetate, and ethyl lactate.

Examples of the nitrogen-containing compound that can be included in the organic solvent may include 2-pyrrolidone and N-methyl-2-pyrrolidone, and examples of the sulfur-containing compound may include dimethyl sulfoxide, tetramethyl sulfone, and thioglycol.

When the organic solvent is used together with the water-based solvent, the amount of the organic solvent may be about 0.1-130 parts by weight based on 100 parts by weight of water. When the amount of the organic solvent is less than 0.1 parts by weight, the ink is so quickly evaporated that the stability of the ink may decrease. When the amount of the solvent is greater than 130 parts by weight, the viscosity of the ink composition may increase too high and an ejecting efficiency may decrease.

The ink composition according to the above embodiment of the present general inventive concept may further include various additives to improve properties of the ink composition. More particularly, the ink composition may include at least one component selected from a group consisting of a wetting agent, a dispersing agent, a surfactant, a viscosity modifier, a pH regulator, and an antioxidizing agent. The amount of the additives may be about 0.1-20 parts by weight, and about 0.1-10 parts by weight, based on 100 parts by weight of the total amount of the ink composition.

To obtain optimized conditions of the ink composition according to the above embodiment of the present general inventive concept, the surface tension of the ink composition may be about 15-70 dyne/cm at 20° C., and about 25-55 dyne/cm at 20° C. The viscosity of the ink composition may be about 1.5-20 cps, and about 1.5-3.5 cps.

A method to prepare the ink composition described above will now be described.

First, a dispersion of phthalocyanine, a viscosity modifier, a surfactant, etc. are added to a water-based solvent, and the mixture is sufficiently stirred using a stirrer to prepare a uniform mixture. Then, the uniform mixture is passed through a filter to prepare an ink composition.

A multicolor ink set including at least two ink compositions prepared according to the above embodiment of the present general inventive concept can be prepared. The multicolor ink set can be used in an ink receiving unit of an inkjet recording apparatus or an ink cartridge of an inkjet printer. An inkjet recording apparatus according to an embodiment of the present general inventive concept may include a thermal head from which ink droplets are ejected by a vapor pressure obtained from heating the ink composition, a piezoelectric head from which ink droplets are ejected by a piezoelectric device, and a disposable head or a permanent head. In addition, the inkjet recording apparatus can be a scanning type printer or an array type printer, and the array type printer can have at least 10,000 nozzles, and can be used for desktop, textile, and industrial purposes. These properties of the inkjet recording apparatus are described for illustrative purposes only, and the use of the inkjet recording apparatus is not limited thereto.

The substituents that are used in the present general inventive concept may be defined as follows.

The term "alkyl" indicates a saturated, monovalent, straight or branched hydrocarbon group having about 1-20 carbon atoms, about 1-10 carbon atoms, and about 1-6 carbon atoms. The alkyl group can be arbitrarily substituted with at least one halogen substituent. Examples of the alkyl group may include a methyl group, an ethyl group, a propyl group, a 2-propyl group, an n-butyl group, an iso-butyl group, a tert-butyl group, a pentyl group, a hexyl group, a dodecyl group, a fluoromethyl group, a difluoromethyl group, a trifluoromethyl group, a chloromethyl group, a dichloromethyl group, a trichloromethyl group, an iodomethyl group, and a bromomethyl group.

The term "aryl" indicates a carbocyclic, monovalent, monocyclic, bicyclic, or tricyclic aromatic hydrocarbon group having about 6-30 carbon atoms, and about 6-18 carbon atoms. The aryl group can be arbitrarily substituted with at least one halogen substituent. In particular, the aryl group may form a fused ring, and at least one hydrogen atom may be substituted with an arylamino group, a heteroarylamino group, an arylalkyl group, a heteroarylalkyl group, an arylaminoarylamino group, an arylalkylarylamino group, an arylalkylarylalkyl group, a heteroarylaminoarylamino group, an arylaminoheteroarylamino group, a heteroarylalkylarylamino group, an arylalkylheteroarylalkyl group, an arylazo group, an arylazoarylamino group, a heteroaryl group, a heteroarylazoarylamino group, a heteroarylazoheteroarylamino group, and an arylazoarylalkyl group.

The term "heteroalkyl" indicates an alkyl group, wherein at least one carbon atom in the main chain of the alkyl group is substituted with a hetero atom such as nitrogen, sulfur, oxygen, or phosphorous.

The term "heteroaryl" indicates an aryl group, wherein at least one carbon in the ring of the aryl group is substituted with a hetero atom such as nitrogen, sulfur, oxygen, or phosphorous. In particular, the heteroaryl group may form a fused ring, and at least one hydrogen atom may be substituted with an arylamino group, a heteroarylamino group, an arylalkyl group, a heteroarylalkyl group, an arylaminoarylamino group, an arylalkylarylamino group, an arylalkylarylalkyl group, a heteroarylaminoarylamino group, an arylaminoheteroarylamino group, a heteroarylalkylarylamino group, an arylalkylheteroarylalkyl group, an arylazo group, an arylazoarylamino group, a heteroaryl group, a heteroarylazoarylamino group, a heteroarylazoheteroarylamino group, and an arylazoarylalkyl group.

FIG. 1 is a perspective view illustrating an inkjet recording apparatus including an ink cartridge having an ink composition according to an embodiment of the present general inventive concept.

Referring to FIG. 1, the inkjet recording apparatus may include an ink cartridge 11 having an ink composition that contains a colorant and pseudo-colorant additives. A printer cover 8 can be connected to a main body 13 of a printer 5 in FIG. 1. An engaging portion of a movable latch 10 can protrude through a hole 7. The movable latch 10 engages with a fixed latch 9 that is coupled to an inner side of the printer cover 8 when the printer cover 8 is closed. The printer cover 8 can have a recess 14 in a region corresponding to the engaging portion of the movable latch 10 protruding through the hole 7. The ink cartridge 11 is positioned such that ink can be ejected onto paper 3 that passes under the ink cartridge 11.

Figure 2:
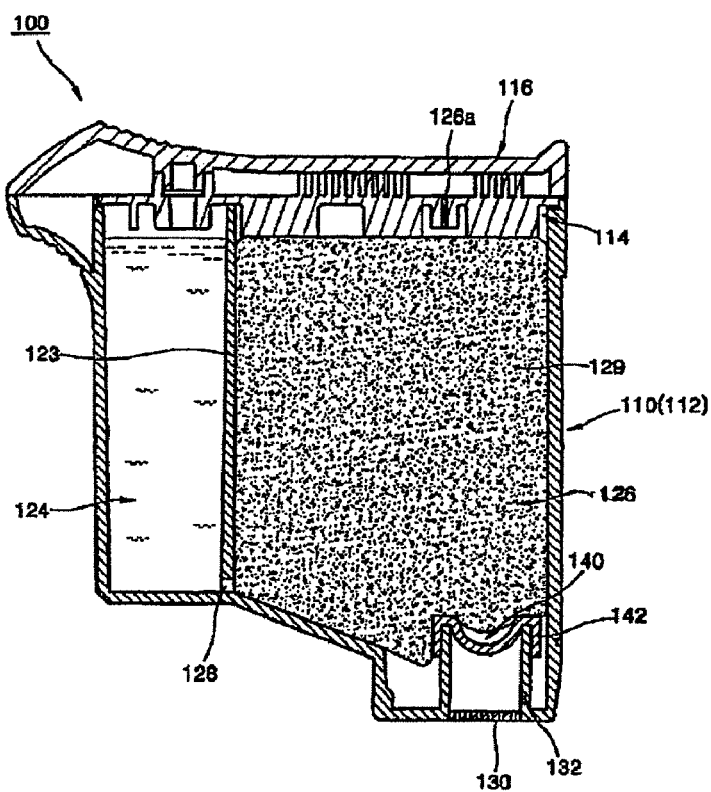
FIG. 2 is a cross-sectional view illustrating an ink cartridge having an ink composition according to an embodiment of the present general inventive concept.

FIG. 2 is a cross-sectional view illustrating an ink cartridge having an ink composition according to an embodiment of the present general inventive concept. Referring to FIG. 2, the ink cartridge 100 of the inkjet printer may include an ink cartridge main body 110 including an ink storage tank 112, an inner cover 114 covering a top portion of the ink storage tank 112, and an outer cover 116 that is separated by a predetermined gap from the inner cover 114 in order to encapsulate the ink storage tank 112 and the inner cover 114.

The ink storage tank 112 can be divided into a first chamber 124 and a second chamber 126 by a vertical barrier wall 123. An ink path 128 between the first chamber 124 and the second chamber 126 can be formed in a bottom portion of the vertical barrier wall 123. The first chamber 124, a sponge 129, and the second chamber 126 are filled with ink. A vent hole 126a in the inner cover 114 can be aligned with the second chamber 126.

In addition, a filter 140 can be disposed in a lower portion of the second chamber 126, so that ink impurities and fine bubbles are filtered to prevent ejection holes of a printer head 130 from being blocked. A hook 142 can be formed in the edge of the filter 140 and is coupled to a top portion of a standpipe 132. Thus, ink is ejected from the ink storage tank 112 onto a printing medium in a liquid-drop form through the ejection holes of the printer head 130.

Hereinafter, the present general inventive concept will be described in greater detail with reference to the following examples. The following examples are for illustrative purposes only and are not intended to limit the scope of the general inventive concept.

Ingredients in Examples 1-4 were completely mixed in a mixer to prepare ink compositions according to Examples 1-4.

EXAMPLE 1

Dyestuff A

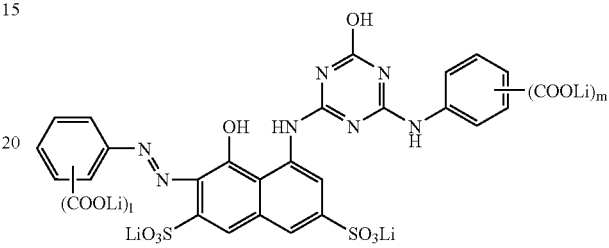

Acetylene Glycol-Based Compound A

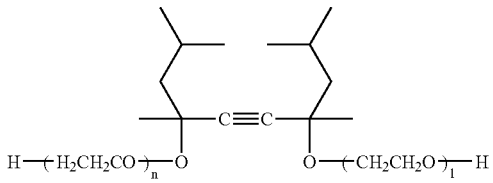

Here, an average of the sum of n and m is about 10, and the ink compositions includes:

| | |
|---|---|
| Dyestuff A | 4 wt % |
| Acetylene glycol-based compound A | 0.6 wt % |
| Etriol | 5 wt % |
| Glycerol | 2.2 wt % |
| Diethylene glycol | 4.4 wt % |
| 2-pyrrolidone | 2.2 wt % |
| Sorsperese 20000 | 1 wt % |
| Water (deionized water) | 80.6 wt % |

EXAMPLE 2

Dyestuff B

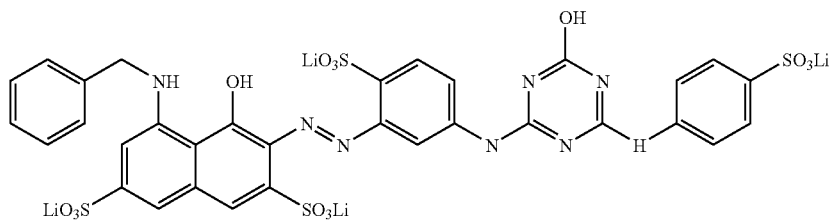

Acetylene Glycol-Based Compound B

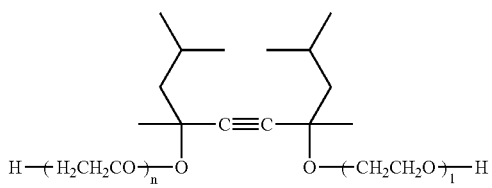

Here, an average of the sum of n and m is about 3.5, and the ink compositions includes:

| | |
|---|---|
| Dyestuff B | 4.0 wt % |
| Acetylene glycol-based compound B | 0.1 wt % |
| Etriol | 5 wt % |
| Glycerol | 9.5 wt % |
| Diethylene glycol | 5.5 wt % |
| Ethylene glycol | 4.5 wt % |
| Triethylamine | 8 wt % |
| Tergitol 15-S-5 | 1 wt % |
| Water (deionized water) | 62.4 wt % |

EXAMPLE 3

Dyestuff C

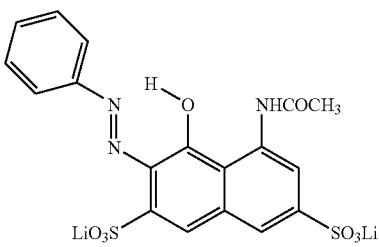

Acetylene Glycol-Based Compound C

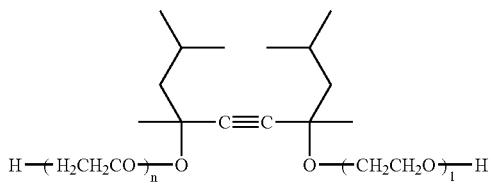

Here, an average of the sum of n and m is about 30, and the ink composition includes:

| | |
|---|---|
| Dyestuff C | 4.5 wt % |
| Acetylene glycol-based compound B | 0.5 wt % |
| Etriol | 5 wt % |
| Diethylene glycol | 9.5 wt % |
| Ethylene glycol | 10.5 wt % |
| Diethanloamine | 6 wt % |
| Water (deionized water) | 64 wt % |

EXAMPLE 4

Dyestuff D

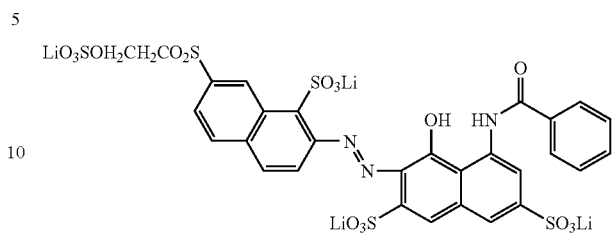

Acetylene Glycol-Based Compound D

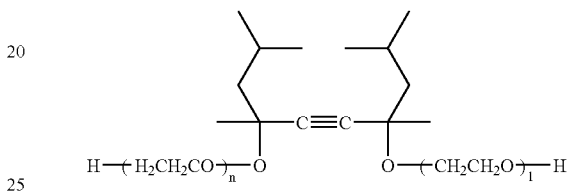

Here, an average of the sum of n and m is about 10, and the ink composition includes:

| | |
|---|---|
| Dyestuff D | 3.5 wt % |
| Acetylene glycol-based compound D | 0.5 wt % |
| Etriol | 5 wt % |
| Glycerol | 10.5 wt % |
| Diethylene glycol | 4.5 wt % |
| Ethylene glycol | 5.5 wt % |
| Triethanolamine | 6 wt % |
| Span 20 | 0.5 wt % |
| Water (deionized water) | 64 wt % |

COMPARATIVE EXAMPLE 1

An ink composition was prepared in the same manner as in Example 1, except that etriol and the acetylene glycol-based compound were not used as additives.

COMPARATIVE EXAMPLE 2

An ink composition was prepared in the same manner as in Example 2, except that C.I. Direct Green 26 (CIBA) substituted with a sodium salt was used as a dyestuff.

COMPARATIVE EXAMPLE 3

An ink composition was prepared in the same manner as in Example 3, except that Acid Red 1 (Fluka) was used.

COMPARATIVE EXAMPLE 4

An ink composition was prepared in the same manner as in Example 4, except that the acetylene glycol-based compound obtained from Air products Co. was not used.

The properties of the ink compositions prepared according to Examples 1-4 and Comparative Examples 1-4 were measured and evaluated using methods described below.

Long-Term Storage Stability:

100 ml of each of the ink compositions prepared according to Examples 1-4 and Comparative Examples 1-4 were filled into a heat-resistant glass, inlets of the heat-resistant glass were sealed, and the heat-resistant glass was stored in a water bath at 60° C. After 2 months, deposition was observed on the bottom of the heat-resistant glass and evaluated as follows. The results are illustrated in Table 1.

TABLE 1

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| evaluation | o | o | o | o | x | x | x | x |

Evaluation:
o: Deposition not found,
x: Deposition found.

Smearfastness:

The ink compositions prepared according to Examples 1-4 and Comparative Examples 1-4 were refilled into an ink cartridge M-50 (manufactured by Samsung Co,), a test pattern was printed using a printer (MJC-2400C, manufactured by Samsung Co.) with a color ink of C-60 (manufactured by Samsung Co.). After 30 minutes, the dot line regions of borderline between two adjacent colors at which color mixing occurred were measured using a microscope and the results are illustrated in Table 2, where the degree of smearfastness was evaluated based on the following:

5: Color mixing did not occur in the borderline.
4: Color mixing corresponding to a width of diameter of 1 dot occurred.
3: Color mixing corresponding to a width of 2 dot diameters occurred.
2: Color mixing corresponding to a width of 3 dot diameters occurred.
1: Color mixing corresponding to a width of 4 or more dot diameters (based on 600 dpi, 1 dot diameter=100 μm) occurred.

TABLE 2

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| evaluation | 5 | 4 | 4 | 4 | 3 | 2 | 3 | 3 |

As illustrated in Table 2, smearfastness of the ink compositions according to Examples 1-4 was improved compared to smearfastness of the ink compositions according to Comparative Examples 1-4.

Jettability:

The ink compositions prepared according to Examples 1-4 and Comparative Examples 1-4 were filled into an ink cartridge of an inkjet printer, and a print pattern was printed to measure printability. The results are illustrated in Table 3.

TABLE 3

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| evaluation (room temperature) | o | o | o | o | x | x | o | Δ |
| evaluation | o | o | o | o | x | x | Δ | x |

The results illustrated in Table 3 are based on the following:

○: no nozzle was blocked
☐: 1-2 nozzles were blocked
X: more than 3 nozzles were blocked Reliability of Printer Head:

The ink compositions prepared according to Examples 1-4 and Comparative Examples 1-4 were filled into an inkjet printer having a thermal device, and the ink compositions were ejected onto paper. The initial velocity of ejecting ink droplets and the velocity of ejecting ink droplets after 100,000,000 pulses were measured to calculate ejection velocity change (ejection velocity reducing rate (%)). The results are illustrated in Table 4.

A surface of the thermal device was observed using an optical microscope after 100,000,000 pulses of ejection, and a state of kogation was inspected. A state having no substantial amount of kogation was indicated as "A". A state having little amount of kogation was indicated as "B". A state having substantial amount of kogation was indicated as "C". The results are also illustrated in Table 4.

TABLE 4

| | Ejection velocity reducing rate (%) | State of Kogation |
|---|---|---|
| Example 1 | 5 | A |
| Example 2 | 10 | A |
| Example 3 | 5 | A |
| Example 4 | 9 | A |
| Comparative Example 1 | 60 | C |
| Comparative Example 2 | 55 | C |
| Comparative Example 3 | 43 | C |
| Comparative Example 4 | 64 | C |

As illustrated in Table 4, when the ink compositions prepared according to Examples 1-4 were used in a thermal inkjet printer, the ejection velocity reducing rate after 100,000,000 pulses was less than 20%, and thus the ink compositions may be practically used. Oxidation occurred on the surface of the thermal device. However, kogation was not found.

Meanwhile, when the ink compositions prepared according to Comparative Examples 1-4 were used, the ejection velocity reducing rate after 100,000,000 pulses was greater than 40-50%, and thus the ink compositions cannot be practically used. Particularly, the ink composition was not ejected due to kogation in Comparative Example 4, and the kogation was observed on all regions of the surface of the thermal device.

The ink composition according to the present general inventive concept including an azo-based colorant, etriol, and an acetylene glycol-based compound has improved uniformity in printed images, and a long-term reliability by improving solubility and thermal stability, wherein reaction of ink and occurrence of kogation are prevented on the surface of a heater due to improved stability and uniformity, and thus ink droplets are stably ejected during long-term use.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition, comprising:
    an azo-based colorant which is at least one selected from a group consisting of compounds represented by Formulae 4 to 7;
    etriol;
    an acetylene glycol-based compound; and
    a solvent:

Formula 4:

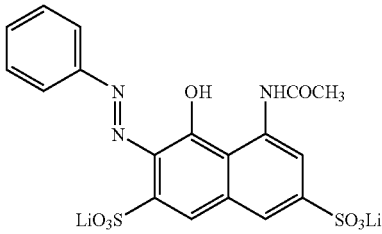

Formula 5:

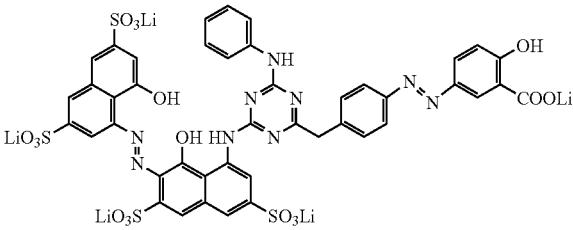

Formula 6:

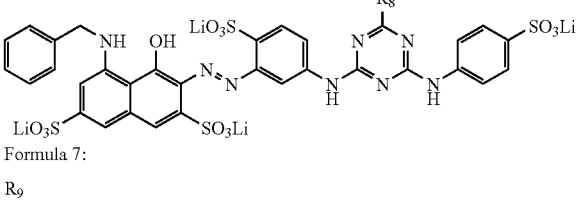

Formula 7:

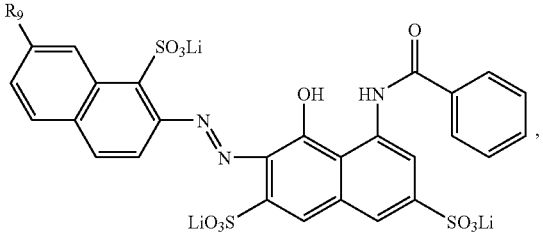

wherein $R_8$, and $R_9$ are each independently one of a hydroxyl group, a halogen atom, and a substituted or unsubstituted C1-C10 heteroalkylsulfonic acid salt.

2. The ink composition of claim 1, wherein the acetylene glycol-based compound is represented by Formula 8:

Formula 8:

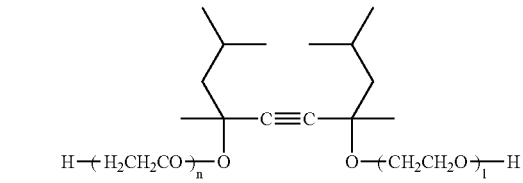

where the sum of n and l is an integer from 0-100.

3. The ink composition of claim 1, wherein the amount of the azo-based colorant is in the range of about 1-20 wt % based on the total amount of the ink composition.

4. The ink composition of claim 1, wherein the amount of etriol is in the range of about 0.1-10 wt % based on the total amount of the ink composition.

5. The ink composition of claim 1, wherein the amount of the acetylene glycol-based compound is in the range of about 0.001-10 wt % based on the total amount of the ink composition.

6. The ink composition of claim 1, wherein the solvent is one of a water-based solvent, an organic solvent, and a mixture thereof.

7. The ink composition of claim 1, wherein the mount of the solvent is in the range of 70-90 parts by weight based on the total amount of the ink composition.

8. The ink composition of claim 6, wherein the organic solvent is at least one selected from a group consisting of a monohydric alcohol, a ketone, an ester, polyhydric alcohol, a polyhydric alcohol derivative, a nitrogen-containing compound, and a sulfur-containing compound.

9. The ink composition of claim 1, wherein the solvent comprises 100 parts by weight of a water-based solvent and 0.1-130 parts by weight of an organic solvent.

10. The ink composition of claim 1, wherein a surface tension of the ink composition is in the range of 15-70 dyne/cm at 20° C.

11. The ink composition of claim 1, wherein the viscosity of the ink composition is in the range of 1.5-20 cps.

12. The ink composition of claim 8, wherein the sulfur-containing compound is one of dimethyl sulfoxide, tetramethyl sulfone, and thioglycol.

13. A multicolor ink set comprising at least two ink compositions, wherein at least one ink composition comprises:
an azo-based colorant which is at least one selected from a group consisting of compounds represented by Formulae 4 to 7;
etriol;
an acetylene glycol-based compound; and
a solvent:

Formula 4:

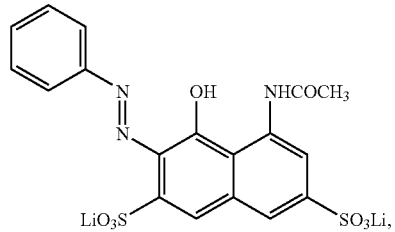

Formula 5:

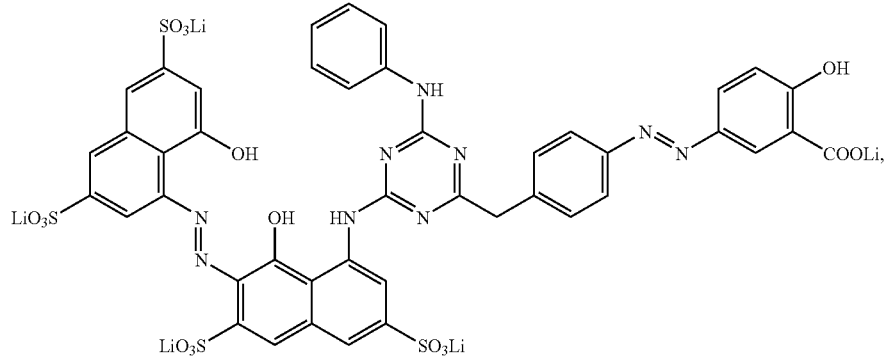

Formula 6:

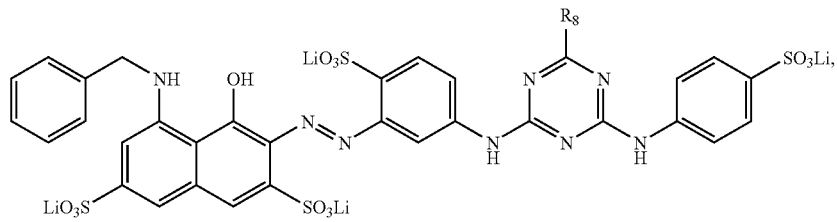

Formula 7:

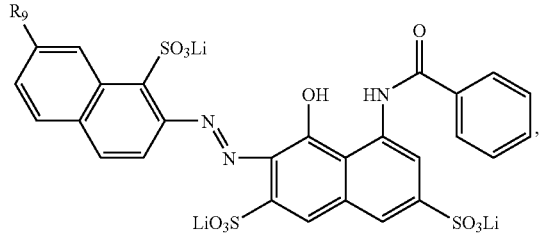

wherein $R_8$, and $R_9$ are each independently one of a hydroxyl group, a halogen atom, and a substituted or unsubstituted C1-C10 heteroalkylsulfonic acid salt.

14. An ink cartridge of an inkjet recording apparatus comprising a multicolor ink set wherein the multicolor ink set comprises at least two ink compositions, and at least one ink composition comprises:

an azo-based colorant which is at least one selected from a group consisting of compounds represented by Formulae 4 to 7;

etriol;

an acetylene glycol-based compound; and a solvent:

Formula 4:

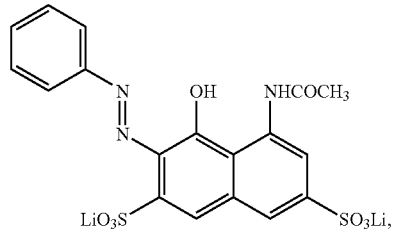

Formula 5:

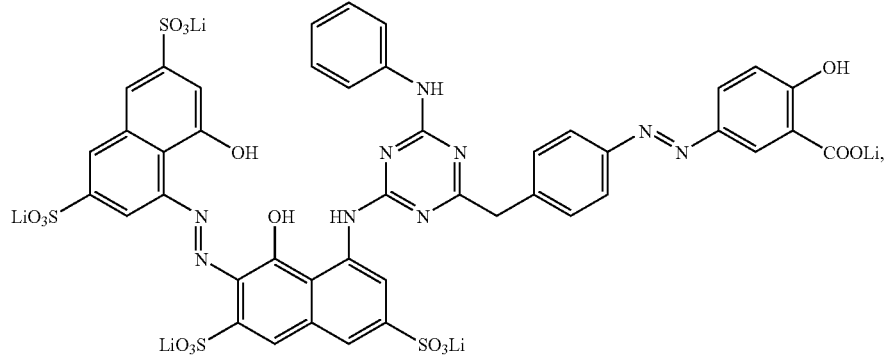

Formula 6:

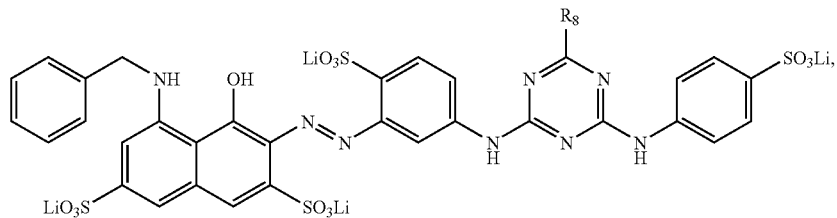

Formula 7:

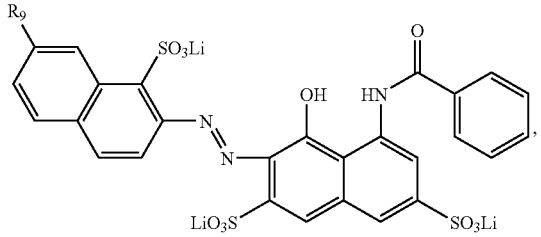

wherein $R_8$, and $R_9$ are each independently one of a hydroxyl group, a halogen atom, and a substituted or unsubstituted C1-C10 heteroalkylsulfonic acid salt.

15. An inkjet recording apparatus comprising an ink cartridge comprising:
   a multicolor ink set comprising at least two ink compositions, wherein at least one of the at least two ink compositions comprises:
   an azo-based colorant which is at least one selected from a group consisting of compounds represented by Formulae 4 to 7;
   etriol;
   an acetylene glycol-based compound; and
   a solvent:

Formula 4:

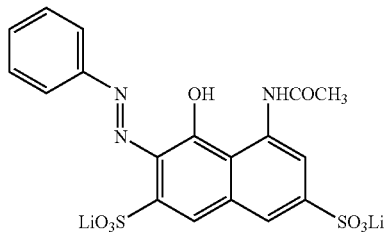

Formula 5:

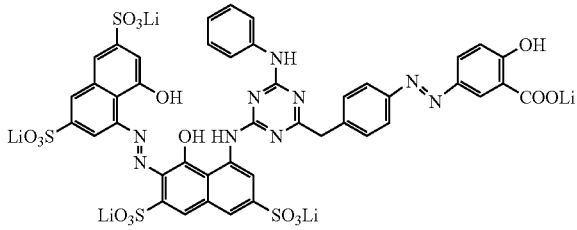

-continued

Formula 6:

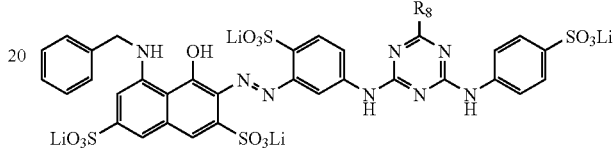

Formula 7:

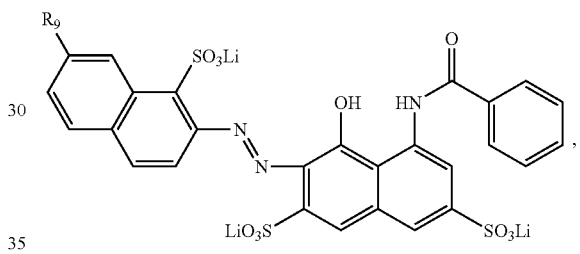

wherein $R_8$, and $R_9$ are each independently one of a hydroxyl group, a halogen atom, and a substituted or unsubstituted C1-C10 heteroalkylsulfonic acid salt.

16. The inkjet recording apparatus of claim 14 further comprising a thermal head.

17. The inkjet recording apparatus of claim 14 further comprising an array head having at least 10,000 nozzles.

18. An image forming apparatus, comprising:
   an ink cartridge containing at least one ink composition having an azo-based colorant, etriol, an acetylene glycol-based compound, and a solvent,
   wherein the azo-based colorant is at least one selected from a group consisting of compounds represented by Formulae 4 to 7

Formula 4:

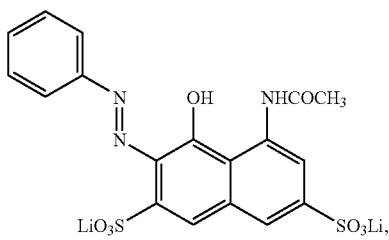

Formula 5:
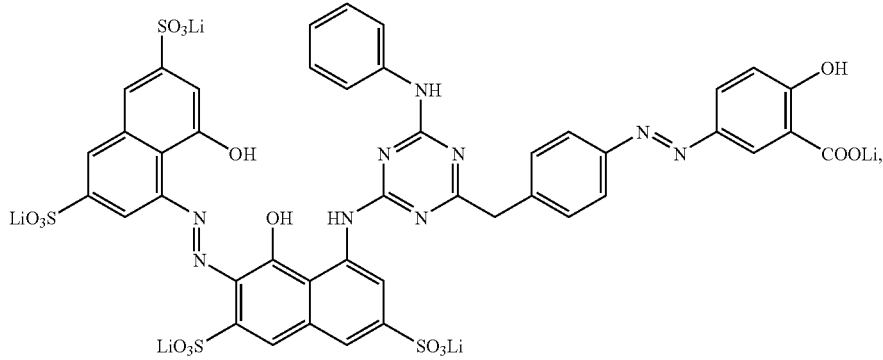
Formula 6:
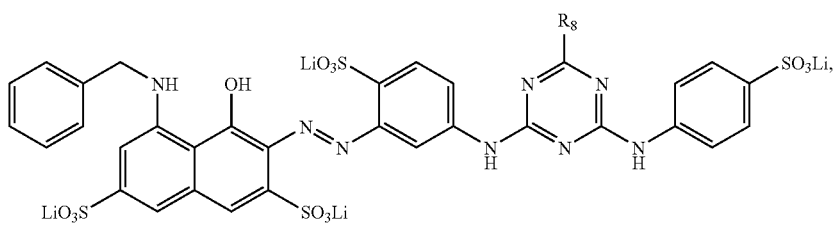
Formula 7:
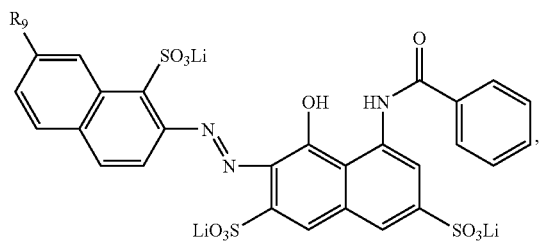
wherein $R_8$, and $R_9$ are each independently on. of hydroxyl group, a halogen atom, and a substituted or unsubstituted C1-C10 heteroalkylsulfonic acid salt.
* * * * *